(12) United States Patent  
Wang et al.

(10) Patent No.: US 7,456,782 B2
(45) Date of Patent: Nov. 25, 2008

(54) TIMING CALIBRATION FOR FAST SIGNAL REACQUISITION IN NAVIGATIONAL RECEIVERS

(75) Inventors: Chi-Shin Wang, Half Moon Bay, CA (US); Lianxue Xiong, Shanghai (CN); Zhike Jia, San Jose, CA (US); Lei Dong, Cupertino, CA (US); Jingbin Liu, Shanghai (CN)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 11/322,654

(22) Filed: Dec. 29, 2005

(65) Prior Publication Data

US 2007/0152876 A1 Jul. 5, 2007

(51) Int. Cl.
*G01S 5/14* (2006.01)
(52) U.S. Cl. .............................. 342/357.02; 342/357.12; 342/357.15
(58) Field of Classification Search ............ 342/357.02, 342/357.12, 357.15
See application file for complete search history.

(56) References Cited

U.S. PATENT DOCUMENTS

| | | | | |
|---|---|---|---|---|
| 5,615,236 A | * | 3/1997 | Turney | 375/365 |
| 5,629,708 A | * | 5/1997 | Rodal et al. | 342/357.15 |
| 5,854,605 A | * | 12/1998 | Gildea | 342/357.03 |
| 5,893,044 A | | 4/1999 | King | |
| 5,940,027 A | * | 8/1999 | Forseth et al. | 342/357.06 |
| 6,320,536 B1 | | 11/2001 | Sasaki | |
| 6,445,341 B2 | * | 9/2002 | Hasegawa | 342/357.13 |
| 6,662,107 B2 | * | 12/2003 | Gronemeyer | 701/213 |
| 6,714,160 B2 | | 3/2004 | Mcburney | |
| 6,725,157 B1 | | 4/2004 | Yu | |
| 7,148,844 B2 | * | 12/2006 | Salkhi | 342/357.12 |

OTHER PUBLICATIONS

Thurston, Jeff. "Galileo, Glonass And Navstar: A Report on GPS for GIS People," GISCafe.com, Mar. 2002.*

* cited by examiner

*Primary Examiner*—Gregory C Issing

(57) ABSTRACT

The present invention provides GPS receivers with clock calibration for fast reacquisition of GPS signals after waking up from a sleep state or coming out of signal blockage. In a preferred embodiment, a GPS receiver comprises a local clock based on an oscillator, e.g., crystal oscillator. The GPS receiver calculates a clock calibration value based on a computed oscillator count for the period during which the GPS receiver is in the sleep state or the signal is blocked. This clock calibration value is used to calibrate the local clock after the GPS receiver wakes up or comes out of signal blockage for fast reacquisition of GPS signals.

27 Claims, 3 Drawing Sheets

TIMING CALIBRATION FOR FAST SIGNAL REACQUISITION IN NAVIGATIONAL RECEIVERS

FIELD OF THE INVENTION

The present invention relates to satellite based navigational receivers, and more particularly to techniques for fast reacquisition of navigational signals after a navigation receiver experiences a signal block or wakes up from a sleep mode.

BACKGROUND

The global positioning system (GPS) is a satellite based radio-navigation system built and operated by the United States Department of Defense. The Russian government operated 'GLONASS' and European Union proposed 'Galileo' are two other important satellite based navigational systems.

GPS permits a user of the system to determine his or her position on the surface of the earth. The system consists of twenty-four satellites circling the earth at an altitude of about 11,000 miles with a period of about 12 hours. It is possible to have more than twenty-four satellites due to the presence of some spare satellites in the GPS constellation. These satellites are placed in six different orbits such that at any time a minimum of six and a maximum of more than eleven satellites are visible to any user on the surface of the earth except in the polar region. Each satellite transmits an accurate time and position signal referenced to an atomic clock. A typical GPS receiver locks onto this signal and extracts the data contained in it and with signals from a sufficient number of satellites, a GPS receiver can calculate its position, velocity, altitude, and time.

Sometimes GPS receivers are required to operate under very weak signal conditions as in foliage or indoors. In the present day practice, the receiver may get "assistance" in the form of additional acquisition aiding messages from a server or base station, or Internet based. But providing this type of assistance requires additional infrastructure and may not be available in all places. Also, the receiver requires additional hardware to receive the aiding messages. Therefore there is a need to develop GPS receivers that operate in "standalone" mode under weak or indoor signal conditions. Further, there is a need as in the case of E911 (Enhanced 911), for fast acquisition of the GPS signals. In addition to the above, the power saving in the receiver is also an important requirement.

Most of the standalone high sensitivity GPS receivers are based on a long non-coherent integration involving squaring loss and thus reducing the possible gain while taking a long time to acquire the satellite signal under weak signal conditions. Regarding the prior art in this field, published U.S. Patent Application 2003/0164795 deals with a type of sleep mode where the clock is kept alive during power off. However, this disclosure does not take into account variations in oscillator temperature and signal Doppler. U.S. Pat. No. 5,893,044 uses an accurate real time clock when the signal is interrupted due to blockage. U.S. Pat. No. 6,320,536 discloses a compensated clock using WAAS (Wide Area Augment System) signals. U.S. Pat. No. 6,662,107 discloses a power saving mode which uses a separate clock circuit that is powered all the time. This clock circuit also provides corrections for temperature variations. The clock correction claimed in that patent (claim 19) is based upon the temperature and Doppler. U.S. Pat. No. 6,725,157 describes a procedure wherein the GPS receiver first operates outdoor and then maintains the lock when moved indoor. U.S. Pat. No. 6,757,610 discloses storing some parameters like clock Doppler, receiver velocity for use during the next acquisition or reacquisition.

Present day GPS receivers do not make extensive use of clock calibration. Therefore, there is a need for GPS receivers that use clock calibration to make faster reacquisition of GPS signals possible.

SUMMARY OF THE INVENTION

The present invention provides GPS receivers with clock calibration for fast reacquisition of GPS signals after waking up from a sleep state or coming out of signal blockage.

In a preferred embodiment, a GPS receiver comprises a local clock based on an oscillator, e.g., crystal oscillator. The GPS receiver calculates a clock calibration value based on a computed oscillator count for the period during which the GPS receiver is in the sleep state or the signal is blocked. This clock calibration value is used to calibrate the local clock after the GPS receiver wakes up or comes out of signal blockage for fast reacquisition of GPS signals.

In another embodiment, the oscillator is a temperature compensated crystal oscillator TCXO and the computed oscillator count comprises a TCXO count.

In yet another embodiment, the clock calibration value is compensated for relative motion between the GPS receiver and a GPS satellite during the sleep or signal blockage period.

In yet another embodiment, the clock calibration value is compensated for frequency drift of the oscillator due to changes in temperature.

In yet another embodiment, the GPS receiver compensates the code frequency of the locally-generated pseudo random sequence for Doppler shift when the GPS receiver wakes up or comes out of signal blockage.

In yet another embodiment, the GPS receiver compensates the phase code of the locally-generated pseudo random sequence for changes in distance between the GPS receiver and GPS satellite during the sleep or signal blockage period.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

DETAILED DESCRIPTION OF THE INVENTION

Figure 1:
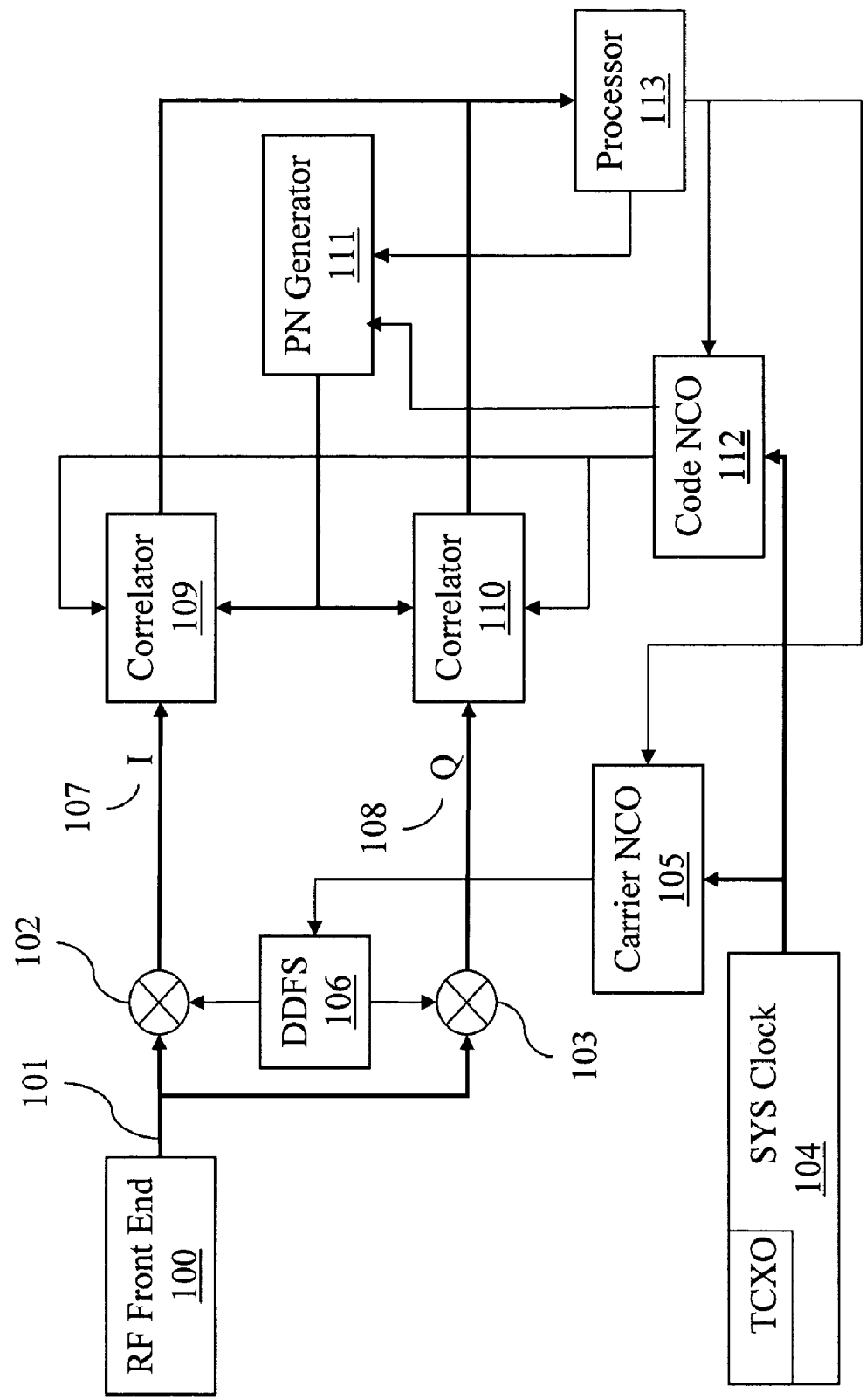
FIG. 1 is a is a functional block diagram of a GPS receiver according to an embodiment of the invention.

FIG. 1 is a functional block diagram of a GPS receiver according to an embodiment of the present invention. An RF front-end 100 processes the RF signal received at the antenna (not shown). Operations of a conversional RF front-end 100 include amplification, down-conversion, and analog-to-digital conversion. The RF front end 100 outputs an intermediate frequency (IF) signal 101 to a baseband section of the receiver from its analog-to-digital converter (ADC) output (not shown). The RF front-end 100 down converts the received RF into the intermediate frequency (IF) for baseband processing. The IF signal 101 is made available to two paths, one in-phase (I) and the other in-quadrature (Q). In the I path, the IF signal 101 is multiplied in IF mixer 102 in-phase with a local frequency signal generated by a direct digital frequency synthesizer (DDFS) 106 to produce the in-phase (I) component 107. In the Q path, the same signal 101 is multiplied by the DDFS frequency in-quadrature (i.e., with a phase shift of 90 degrees) to produce the quadrature (Q) component 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of IF signal 101 As a result, the I and Q signals produced by the IF mixers 102 and 103 are near zero carrier frequency. In other words, the outputs I 107 and Q 108 of the IF mixers 102 and 103 are stripped or wiped off from the carrier (IF). The I and Q signals may be low-pass filtered to remove the high frequency components which are equal to twice the IF frequency band.

The I and Q components 107 and 108 are correlated in correlators 109 and 110, respectively, with a locally-generated pseudorandom (PN) sequence generated by a PN generator 111. The PN-sequence corresponds to the channel being processed by the baseband section at that time. The PN sequence generator is driven by code NCO 112. The local code generator frequency is made equal to the code rate of the I and Q paths by corrective feedback from the processor 113 to the code NCO 112. In addition, the processor 113 sends a signal to PN code generator 111 to set the starting phase of the locally generated code. The NCO 112 provides the correct clock signals to correlators 109 and 110. For example, NCO 112 provides a clock signal to generate two samples per PN chip in the signal acquisition stage and three samples per chip during the tracking stage. SYS CLK 104 provides to NCO 105 and NCO 112 a common clock synchronization signal. The correlator output values are then sent to processor 113 at millisecond intervals in the form of 1 ms samples, where each 1 ms samples is the result of correlation of one PN sequence of length 1023 chips. The processor 113 may be a digital signal processor (DSP) core. Preferably, the processor is capable of performing fast math intensive operations. Subsequent processing of the signals takes place in the processor 113, as will be described in detail below. Additional details of the receiver baseband section described above can be found in copending U.S. patent application Ser. No. 11/123,861, titled "Efficient And Flexible GPS baseband Architecture," filed on May 6, 2005, the specification of which is incorporated in its entirety herein by reference.

The processor 113 receives one millisecond integrated (correlated) I and Q values from the GPS baseband section described above. In order to acquire a GPS signal in the processor 113, all dwells (i.e., pairs of carrier frequency and code phase values) are searched. This is a two-dimensional search. Coherent integration and non-coherent integration are two commonly used integration methods to acquire GPS signals. Coherent integration provides better signal to gain at the cost of greater computation load for equal integration times.

The GPS receiver also includes a Temperature Compensated Crystal Oscillator (TCXO), which provides a local reference frequency for system timing, the local receiver clock, down-conversion to the IF signal, sampling timing, and other clock related actions in the GPS receiver. Crystal oscillators are commonly used to provide reference frequencies for GPS receivers. The TCXO is a crystal oscillator that is temperature compensated to minimize frequency variations due to changes in temperature. The TCXO is included in the SYST CLK 104 as shown in FIG. 1. The GPS receiver also includes a Delay Lock Loop (DLL) for synchronizing the locally-generated PN sequence with the PN sequence of the GPS signal by providing the PN code generator 111 with accurate code frequency and code phase.

Figure 2:
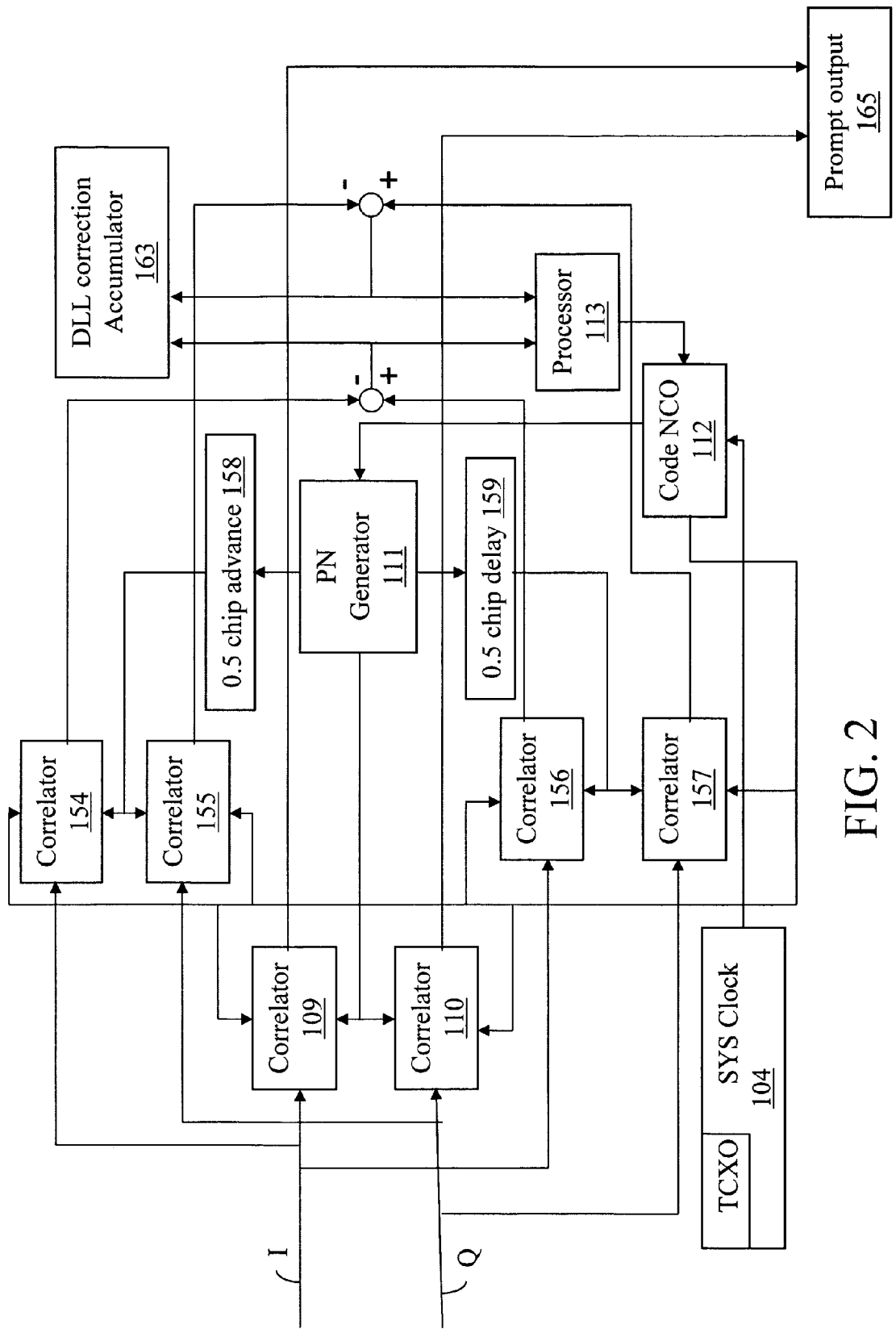
FIG. 2 is a functional block diagram of a Delay Lock Loop (DLL) accumulation process according to an embodiment of the invention.

FIG. 2 illustrates a DLL correction accumulation process during tracking. The I and Q component signals 107 (I) and 108 (Q) of the FIG. 1 are inputted to the DLL. The I and Q correlators 109 and 110 of FIG. 1 are the prompt correlators. The I and Q correlators 154 and 155 are the Early (E) correlators while I and Q correlators 156 and 157 are the late (L) correlators. The reference local PN sequence is advanced by 0.5 chip in the case of the E correlators 154 and 155 as shown in block 158. Similarly, the local PN sequence is delayed by 0.5 chip in the case of the L correlators 156 and 157 as shown in block 159. The DLL correction which is obtained as the difference of the outputs of the E and L correlators is accumulated in memory block 163. This correction signal also changes the code NCO 112 in such a way that the E and L correlators will have same outputs and the prompt correlators 109 and 110 will have the maximum output in 165, thus indicating a perfect synchronization.

In some situations, the GPS receiver may be unable to continuously receive GPS signals. The break in signal reception may be due to signal blockage as experienced under foliage. The GPS receiver may also be in a power saving mode, in which the GPS receiver switches between a sleep state and a wakeup state to save power. Examples of GPS receivers with power saving modes can be found in copending U.S. patent application Ser. No. 11/324,144, titled "An Unassisted Indoor GPS Receiver," filed on the same date as the present application, the specification of which is incorporated in its entirety by reference. In these cases, the GPS signal has to be reacquired often. To help in this reacquisition, an estimation of the acquisition parameters is made using the collected TCXO count and Delay Lock Loop (DLL) compensation. The TCXO count and DLL compensation are collected when the receiver is in reception of a sufficient number of signals from satellites and is able to compute its position.

The time period during which the GPS receiver can remain without a signal due to signal blockage or sleep state depends on how well timing information is maintained. The better the timing information accuracy, the longer the signal blockage or sleep state time may be. Further, the reacquisition of GPS signals may be faster with accurate parameters. To maintain good timing information, a time matching and compensation scheme is implemented according to an embodiment of the invention. In this embodiment, a 40-bit counter is used to count TCXO pulses. This counter counts TCXO during the power on period and is incremented during the start of the wakeup period as explained below. During a period of x seconds (e.g., 18 seconds) of power on or no signal blockage, the GPS satellite is tracked and the TCXO count for a duration of x*50 bits of GPS navigation data (e.g., 18 seconds corresponds to 900 bits) is the counter value. During the same period, the DLL compensation values from the input to the NCO 112 of the PN code generator 111, and temperature v/s time curve are also obtained and stored in memory. The various parameters needed for the fast reacquisition of the GPS signal are computed as below.

TCXO Compensation

This section discusses TCXO compensation for calibrating the local receiver clock after the GPS receiver has awaken from a sleep state or has come out of signal blockage. The receiver computes a TCXO count for the period of the sleep state. Since the time of the sleep state or power off is known, the correct frequency at wakeup can be calculated as TCXO count/(sleep state period). If the count is more than the sleep state period, then the frequency is assumed to have increased. The correct frequency value is used to calibrate the local receiver clock. This calibration value decreases the frequency search range upon wake up. If not calibrated, the receiver has to search a larger frequency range as it does not know how much the frequency has changed during the sleep period. The receiver searches the frequencies by dividing the possible frequency range into several bins and searching for the signal in each bin. The more bins that need to be searched, the more time it takes to reacquire the satellite signal. If frequency variation is compensated, then the number of frequency bins to search is less and so the satellite signal may be acquired in a shorter time.

Computation of TCXO Count During Power Off or Signal Blockage

In this embodiment, the receiver switches to a sleep state or signals are blocked after the receiver has tracked a GPS satellite for a duration of x*50 navigation data bits, where x is in seconds and the data bits are transmitted at a rate of 50 bits/second. The TCXO count immediately prior to switching to the sleep state or no signal condition is TCXO1. TCXO1 is the TCXO count during the duration of x*50 navigation data bits. In this embodiment, the GPS receiver powers on after y seconds in the sleep state or after a duration of y*50 navigation data bits. For example, y seconds may be the time of the next super-frame, which corresponds to a duration of 1500× 24 bits.

Let TXCO2 be a scaled value of TCXO count over y seconds (e.g., to the start of the next super-frame). TXCO2 may be given by:

$$TCXO2 = TCXO1 * (y*50)/(x*50)$$

Thus, TCXO2 is computed by scaling TCXO1 by the ratio of (y*50)/(x*50). For the example of tracking the GPS satellite for 900 bits (i.e., 18 seconds) and sleeping until the next super-frame (1500×24 bits), the ratio is (1500×24 bits)/(900 bits).

Thus, TCXO2 provides an initial estimate of the duration of signal blockage or sleep time in terms of TCXO count.

Relative Motion Compensation

The next step is to correct the TXCO count for the relative motion between the GPS satellite and the GPS receiver during the sleep time or blockage time. In this step, the distance between the satellite and receiver are computed at the time the satellite goes into sleep mode (receives last bit before going into sleep mode). This distance is denoted D1. D1 may be a pseudorange measurement made during satellite tracking before the receiver goes to the sleep state. The receiver periodically updates the pseudorange while tracking usually once per second. The distance is also calculated between the satellite and receiver at the time the receiver wakes up from sleep mode or is unblocked. This distance is denoted D2. To calculate D2, the position of the satellite at wakeup can be calculated using ephemeris data or almanac data previously received by the GPS receiver and stored in memory before going to sleep. As is well known, ephemeris data provides orbital data parameters for the GPS satellite and other parameters for calculating the position of the GPS satellite as a function of time. Almanac data provides orbital data parameters for all the GPS satellites and can be used to approximate the position of any GPS satellite. Both almanac data and ephemeris are available for all the satellites. The receiver position at wakeup may be approximated by the stored receiver position taken before the sleep state. For example, if the receiver is indoors (e.g., office building) during the sleep state, then it may be assumed that there is less movement of the receiver. The receiver position may be also computed by other means such as an odometer and/or Gyroscope, which may also be combined to obtain the receiver velocity.

The correction to the TXCO count due to relative motion or Doppler may be denoted by C1 and may be given by:

$$C1 = TCXO \text{ frequency} * (Dp2 - D1)/(\text{speed of light})$$

where the TCXO frequency is the frequency of the TCXO pulses. The TCXO frequency may be 16 MHz. This frequency may be multiplied or divided as required in the receiver by synthesizers. The speed of light may be assumed to be constant at 300,000 Kms/second.

Temperature Drift Compensation

This step is not required for the TXCO because the TCXO has circuitry that compensates for temperature variations for a more constant frequency. This is because TCXOs are temperature compensated and so the frequency variation may be assumed to be small over a comparatively short sleep period of, e.g., 12.5 minutes. However, this step may be necessary for an uncompensated crystal oscillator (XO) to compensate the XO count for frequency drift due to temperature changes. This is because XOs are not temperature compensated and the frequency variation may be large. In this case, a temperature versus frequency drift table may be used to correct the XO count for frequency drift due to temperature changes. This table may be stored in memory on the receiver. In cases where temperature changes, and hence the frequency drift, are small, this step may be ignored.

Let the temperature when the receiver goes to sleep be Ti and the temperature when the receiver is powered on be Tf. The temperature may be detected by a temperature sensor located near the crystal oscillator. Then the temperature difference is Td=Tf−Ti. The frequency change corresponding to Td from the table=fd. Let the change in the TXCO count due to fd=C2.

For example, the temperature may be measured every 6 seconds and the fd may be assumed constant for this 6 seconds. The corresponding count for this interval is fd*(6 seconds). C2 may be obtained by summing the count of each interval during the sleep period. For a sleep period of 732 seconds, there will be 122 intervals.

In cases where a frequency drift table is not available, a rate of change of frequency drift with temperature may be pre-computed and stored in memory. This rate of change has to be computed for different points of temperature versus frequency drift curve.

Also, in cases where a frequency drift table is not available, such a table may be generated during the power on period of the receiver by partitioning the power on period into small time intervals and tabulating temperature versus frequency drift at each of these intervals. The generated table may be used for the temperature range normally experienced by the receiver.

Final Corrected TCXO

The final corrected TXCO count for the period of sleep or signal blockage may be given by:

$$\text{Final corrected TXCO} = TCXO2 + C1 + C2$$

For a temperature compensated crystal oscillator, C2 is not required.

This final corrected calibration value is used to calibrate the local clock at the time the G-PS receiver powers on or comes out of signal blockage. Because of this accurate estimation of the clock through the final corrected TCXO, a fast reacquisition of the GPS signal is possible. In the case of a known sleep state period and no temperature compensation, the TCXO count may be computed before going to sleep. Otherwise the TCXO count is calculated later.

Delay Lock Loop Compensation

To synchronize the locally-generated PN sequence with the PN sequence of the GPS satellite when the receiver wakes up or comes out of blockage, code frequency and code phase corrections are needed. Such corrections may be needed for every satellite because each satellite has a different PN sequence.

To compute code frequency and code phase, some prior information such the receiver time, receiver position, GPS time, satellite position, effective navigation information (e.g., ephemeris, almanac, ect.) are needed. The value of position fixed and all the above information are stored in memory before the receiver goes to sleep or signal blockage.

Code Frequency Compensation for Doppler Shift due to Velocity of Satellite

The first step is to compensate the code frequency at the instance the receiver wakes up for the Doppler shift due to the velocity of the satellite.

If the sleeping duration is accurate enough, the pseudorange between the satellite and the receiver at the instance the receiver wakes up from the sleep state can be calculated. The pseudorange is a first order approximation of distance and can be calculated using the stored ephemeris data. To calculate the pseudorange, the position of the satellite can be calculated from stored ephemeris. The receiver position may be approximated as the previously stored receiver position assuming there is little movement in, e.g., an indoor environment. Alternatively, the receiver position may be calculated using an odometer and/or Gryoscope. The relative velocity (rate of change of pseudorange) of the satellite to receiver may be obtained by calculating the pseudorange at two different times and dividing by the time difference. This gives the pseudorange rate variation along the direction of the receiver and satellite. Based on the velocity, the Doppler shift of the code frequency due to satellite velocity at that moment can be predicted. The register of Code_Frequency can be updated when the receiver wakes up.

Phase Code

The second step is to compensate the phase code for the change in pseudorange or distance from the receiver to the satellite between the time that the receiver goes to sleep or signal is blocked and the time that the GPS wakes up from the sleep state or comes out of signal blockage. The pseudoranges may be calculated as explained above. Based on the pseudorange difference and the navigation information (e.g., ionsphere parameters), the code phase difference can be calculated. For example, the code difference can be calculated by dividing the pseudorange difference by the length of one code period. The length of one code period is 1 ms*speed of light with no compensation for Doppler shift. The code length can be readily calculated taking Doppler shift into account, where the Doppler shift is calculated based on the relative velocity of the satellite to receiver. The code length is compressed due to Doppler shift when the satellite is moving toward the receiver and expanded due to Doppler shift when the satellite is moving toward the receiver.

Figure 3:
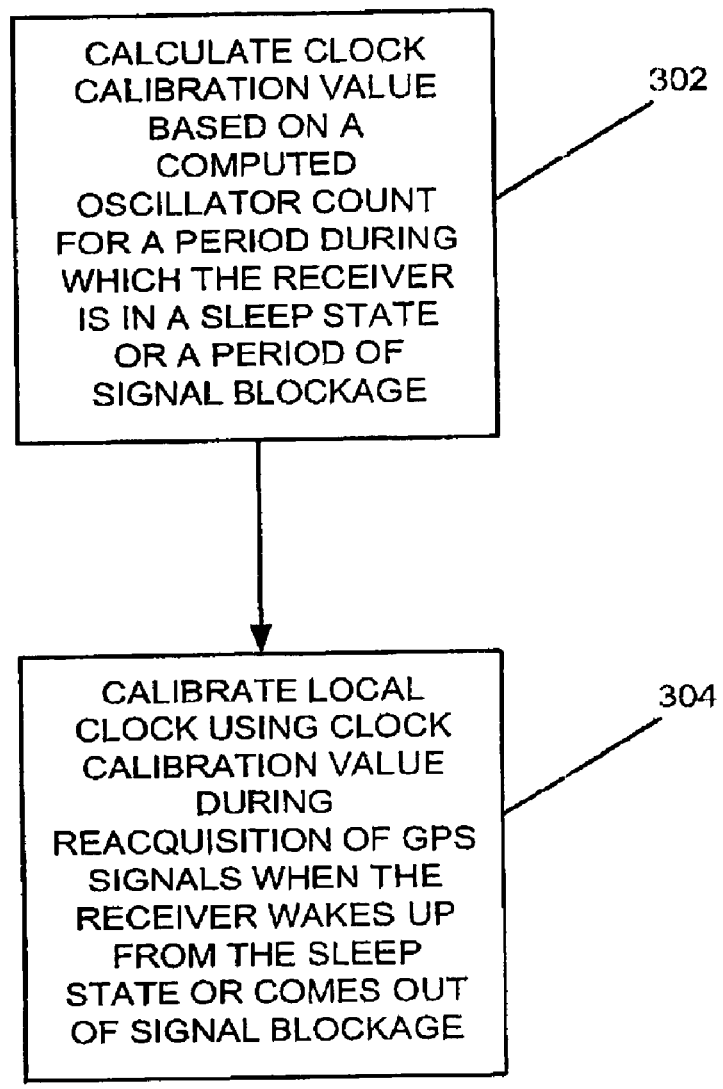
FIG. 3 is a flow chart of an exemplary process for calibrating a local clock of a navigation receiver.

FIG. 3 is a flow chart of an exemplary process 300 for calibrating a local clock of a navigation receiver. The process 300 may be executed, on the processor 113 of FIG. 1 and FIG. 2. In such a case, the processor 113 calculates a clock calibration value based on a computed oscillator count for a period during which the receiver is in a sleep state or for a period of signal blockage (step 302). The processor 113 also calibrates the local clock using the clock calibration value during reacquisition of GPS signals when the receiver wakes up from the sleep state or comes out of signal blockage (step 304). The clock calibration value is compensated for Doppler frequency changes during the period of the sleep state or the period of signal blockage. Accordingly, the process 300 illustrates an exemplary process for calibrating a local clock of a navigation receiver.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A method for calibrating a local clock of a navigation receiver, wherein the local clock is based on an oscillator, comprising:
    calculating a clock calibration value based on a computed oscillator count for a period during which the receiver is in a sleep state or for a duration of signal blockage; and
    calibrating the local clock using the clock calibration value during reacquisition of GPS signals when the receiver wakes up from the sleep state or comes out of signal blockage;
    wherein the clock calibration value is compensated for Doppler frequency changes during the period of the sleep state or the duration of signal blockage.

2. The method of claim 1, wherein the computed oscillator count is
given by:

$$OX2 = OX1 * y/x$$

where OX1 is an oscillator count during a period of x representing a duration of power on or no signal blockage, and y is the period of the sleep state or the duration of signal blockage, and OX2 is the computed oscillator count.

3. The method of claim 1, wherein the oscillator is a temperature compensated oscillator (TCXO) and the oscillator count is a TCXO count.

4. The method of claim 1, wherein the clock calibration value is compensated for frequency drift of the oscillator due to temperature changes during the period of the sleep state or the duration of signal blockage.

5. The method of claim 1, wherein the clock calibration value is compensated for relative motion between the receiver and a navigational satellite during the period of the sleep state or the duration of signal blockage.

6. The method of claim 4, wherein the temperature compensation is computed from a frequency drift versus temperature table.

7. The method of claim 2, wherein the clock calibration value is further compensated for relative motion between the receiver and a navigational satellite during the period of the sleep state or the duration of signal blockage.

8. The method of claim 7, wherein the clock calibration value is further compensated for temperature changes during the period of the sleep state or the duration of signal blockage.

9. The method of claim 1, further comprising compensating a code frequency of a locally-generated signal for Doppler shift due to a velocity of a navigational satellite when the receiver wakes up or comes out of signal blockage.

10. The method of claim 9, wherein the locally-generated signal is a pseudorandom sequence signal.

11. The method of claim 1, further comprising compensating a code phase of a locally-generated signal for a change in distance from the receiver to a satellite between a time the receiver goes to the sleep state and a time the receiver wakes up from the sleep state.

12. The method of claim 1, wherein the navigational receiver is a GPS receiver.

13. The method of claim 1, wherein the navigational receiver is a GLONASS or a Galileo receiver.

14. A navigational receiver, comprising:
a local clock based on an oscillator;
a radio frequency front-end for receiving satellite signals;
a baseband section for processing the received satellite signals into correlated values; and
a processor for integrating the correlated values to acquire the satellite signals, wherein the processor calculates a clock calibration value based on a computed oscillator count for a period during which the receiver is in a sleep state or for a duration signal blockage, and the processor calibrates the local clock using the clock calibration value during reacquisition of GPS signals when the receiver wakes up from the sleep state or comes out of signal blockage;
wherein the processor compensates the clock calibration value for Doppler frequency changes during the period of the sleep state or the duration of signal blockage.

15. The navigational receiver of claim 14, wherein the computed oscillator count is given by:

$$OX2 = OX1 * y/x$$

where OX1 is an oscillator count during a period of x representing a duration of power on or no signal blockage, and y is the period of the sleep state or the duration of signal blockage, and OX2 is the computed oscillator count.

16. The navigational receiver of claim 14, wherein the oscillator is a temperature compensated oscillator (TCXO) and the oscillator count is a TCXO count.

17. The navigational receiver of claim 14, wherein the processor compensates the clock calibration value for frequency drift of the oscillator due to temperature changes during the period of the sleep state or the duration of signal blockage.

18. The navigational receiver of claim 14, wherein the processor compensates the clock calibration value for relative motion between the receiver and a navigational satellite during the period of the sleep state or the duration of signal blockage.

19. The navigational receiver of claim 17, wherein the processor computes the temperature compensation from a frequency drift versus temperature table.

20. The navigational receiver of claim 15, wherein the processor compensates the clock calibration value for relative motion between the receiver and a navigational satellite during the period of the sleep state or the duration of signal blockage.

21. The navigational receiver of claim 20, wherein the processor compensates the clock calibration value for temperature changes during the period of the sleep state or the duration of signal blockage.

22. The navigational receiver of claim 14, further comprising:

a local pseudorandom sequence generator; and
a Delay Lock Loop (DLL) for synchronizing the pseudorandom sequence generator with a pseudorandom sequence of a satellite signal,
wherein the processor computes a code frequency compensation for the DLL to compensate for Doppler shift clue to a velocity of a navigational satellite when the receiver wakes up or comes out of signal blockage.

23. The navigational receiver of claim 14, further comprising:
a local pseudorandom sequence generator; and
a Delay Lock Loop (DLL) for synchronizing the pseudorandom sequence generator with a pseudorandom sequence of a satellite signal,
wherein the processor computes a code phase compensation for the DLL to compensate for a change in distance from the receiver to a satellite between a time the receiver goes to the sleep state and a time the receiver wakes up from the sleep state.

24. The navigational receiver of claim 14, wherein the navigational receiver is a GPS receiver.

25. The navigational receiver of claim 14, wherein the navigational receiver is a GLONASS or a Galileo receiver.

26. A method for calibrating a local clock of a navigation receiver, wherein the local clock is based on an oscillator, comprising:
calculating a clock calibration value based on a computed oscillator count for a period during which the receiver is in a sleep state or for a duration of signal blockage; and
calibrating the local clock using the clock calibration value during reacquisition of GPS signals when the receiver wakes up from the sleep state or comes out of signal blockage,
wherein the computed oscillator count is given by:

$$OX2 = OX1 * y/x$$

where OX1 is an oscillator count during a period of x representing a duration of power on or no signal blockage, and y is the period of the sleep state or the duration of signal blockage, and OX2 is the computed oscillator count.

27. A navigational receiver, comprising:
a local clock based on an oscillator;
a radio frequency front-end for receiving satellite signals;
a baseband section for processing the received satellite signals into correlated values; and
a processor for integrating the correlated values to acquire the satellite signals, wherein the processor calculates a clock calibration value based on a computed oscillator count for a period during which the receiver is in a sleep state or for a duration of signal blockage, and the processor calibrates the local clock using the clock calibration value during reacquisition of GPS signals when the receiver wakes up from the sleep state or comes out of signal blockage,
wherein the computed oscillator count is given by:

$$OX2 = OX1 * y/x$$

where OX1 is an oscillator count during a period of x representing a duration of power on or no signal blockage, and y is the period of the sleep state or the duration of signal blockage, and OX2 is the computed oscillator count.

* * * * *